US005381132A

United States Patent [19]

Yun

[11] Patent Number: 5,381,132

[45] Date of Patent: Jan. 10, 1995

[54] METHOD OF DISPLAYING SELF-ADDRESS DATA IN A PAGER RECEIVER

[75] Inventor: Young-Han Yun, Suwon-city, Rep. of Korea

[73] Assignee: SamSung Electronics Co., Ltd., Kyungki-do, Rep. of Korea

[21] Appl. No.: 737,598

[22] Filed: Jul. 25, 1991

Related U.S. Application Data

[63] Continuation of Ser. No. 356,694, May 25, 1989, abandoned.

[30] Foreign Application Priority Data

Sep. 29, 1988 [KR] Rep. of Korea ................ 1988-12636

[51] Int. Cl.[6] ................ H04Q 1/00

[52] U.S. Cl. ................ 340/825.44; 340/311.1; 455/38.4

[58] Field of Search ................ 340/825.44, 825.45, 340/825.47, 311.1, 825.15, 825.17; 455/185, 186, 38, 185.1, 186.1, 38.4; 370/94.1

[56] References Cited

U.S. PATENT DOCUMENTS 4,160,240 7/1979 Partipilo ................ 455/38
4,422,071 12/1983 de Graaf ................ 340/825.44
4,713,808 12/1987 Gaskill et al. ................ 370/94.1
4,720,885 1/1988 Ohnishi et al. ................ 379/354
4,804,955 2/1989 Yoshizawa ................ 340/825.44
4,825,193 4/1989 Siwiak et al. ................ 340/825.44
4,855,731 8/1989 Yoshizaea et al. ................ 340/825.44
4,860,004 8/1989 Davis ................ 340/825.44
4,882,579 11/1989 Siwiak ................ 340/825.44
5,065,423 11/1991 Gaskill ................ 379/57

*Primary Examiner*—Donald J. Yusko
*Assistant Examiner*—Brian Zimmerman
*Attorney, Agent, or Firm*—Robert E. Bushnell

[57] ABSTRACT

A method of displaying a 7 decimal self CAP code in a display of a pager receiver. The pager receiver has an EEPROM for storing 18 bit address data and 3 bit frame data for enabling the pager receiver to receive a calling signal. The address data and frame data are derived from the CAP code. The EEPROM also stores a binary-coded decimal representation of the 7 decimal self CAP code. When no calling signal is received the CAP code can be displayed by pressing a read key of the pager receiver so that the binary-coded decimal representation can be read and converted to the 7 decimal CAP code. The EEPROM can also store binary-coded decimal representations of further CAP codes which are sequentially read and displayed by continuously keeping the read key pressed.

7 Claims, 5 Drawing Sheets

METHOD OF DISPLAYING SELF-ADDRESS DATA IN A PAGER RECEIVER

This is a continuation of application Ser. No. 07/356,694 filed on 25 May 1989, abandoned.

TECHNICAL FIELD

The present invention relates to a display method in a pager receiver using a Post Office Committee Standard Association Group code (hereinafter referred to as "POCSAG code") and more particularly, to a method capable of displaying an self address code by using a EEPROM.

BACKGROUND ART

Generally, a pager receiver is a kind of a small size radio receiver for calling a person whose position is missed or whose movement is frequent, through a paging system of a land base station. In the pager receiver, a POCSAG code is usually used, while in the paging system, in order to call pager receiver, each of the CAP codes corresponding to each of the addresses (hereinafter referred to as "CAP code") is given and these CAP codes are converted into binary notation to propagate them in 18 bits of address data and 3 bits of frame data in the air. At this time, the pager receiver receives this signal so that it operates. In this case, however, since in the pager receiver using the POCSAG code it is difficult to convert the address bit data back to the CAP codes, there has been a problem in which a local CAP code cannot be displayed on a LCD.

SUMMARY OF THE INVENTION

It is accordingly an object of the present invention to provide a method capable of displaying local specific address data on a LCD in a pager receiver provided with an EEPROM (Electrically Erasable and Programmable ROM) as a ROM thereof, by storing the 18 bits of address data and the 3 bits of frame data and by simultaneously writing the CAP codes themselves in the 7 digits of decimal data.

To achieve the above object and other advantages of the present invention, the displaying method comprises the steps of: storing the decimal CAP codes corresponding to the binary address and frame data in a EEPROM; and displaying the CAP codes stored in said EEPROM on an LCD according to the input of a read key when there is no calling signal.

BRIEF DESCRIPTION OF THE DRAWINGS

The foregoing and other objects as well as advantages of the present invention will become clear by the following description of the present invention with reference to the accompanying drawings, wherein.

DETAILED DESCRIPTION OF THE INVENTION

The invention will now be described in detail with reference to the drawings.

Figure 1:
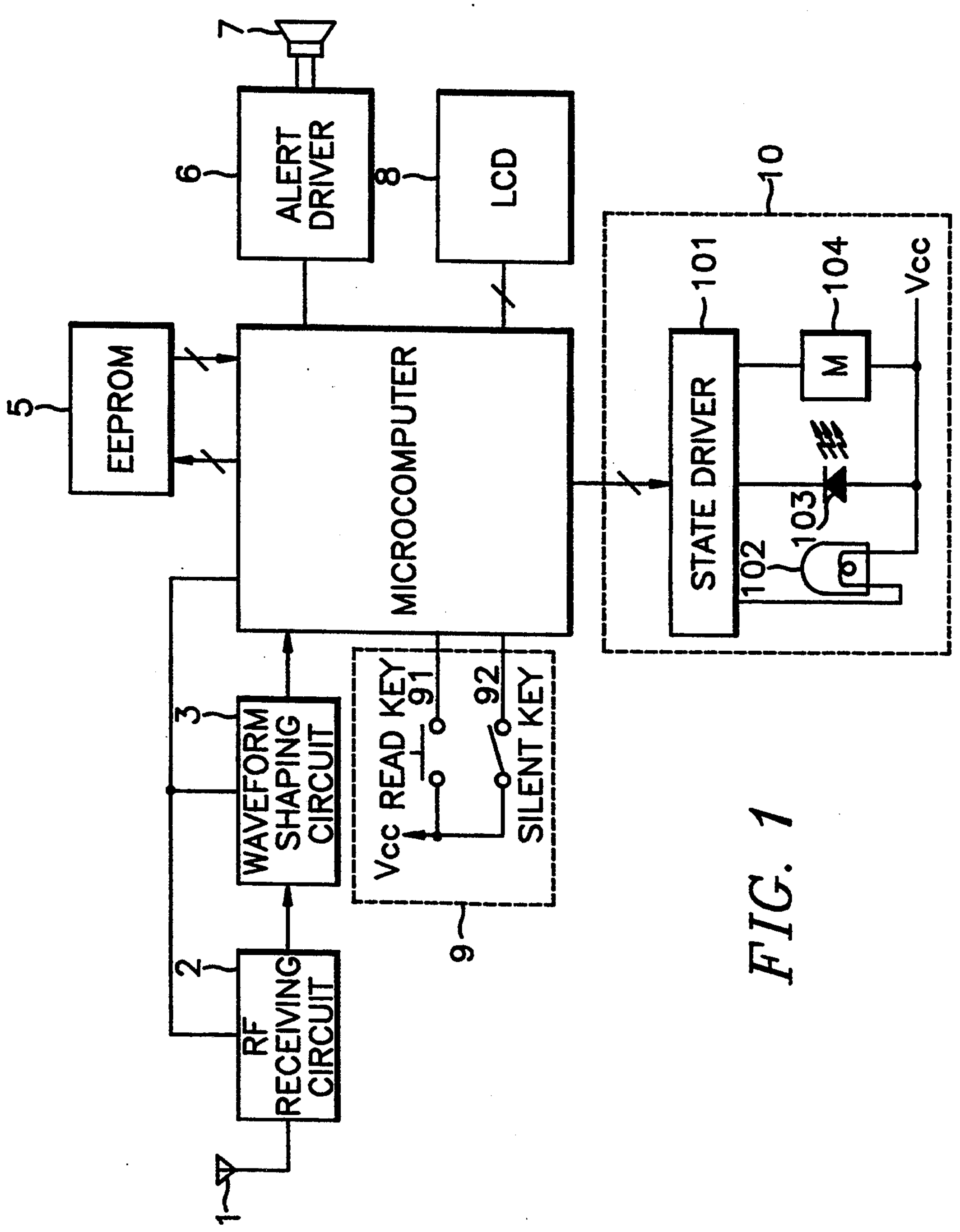
FIG. 1 is a block diagram illustrating schematically a pager receiver system suitable for carrying out the present invention.

FIG. 1 is a block diagram illustrating a pager receiver suitable for carrying out the present invention, which includes an antenna 1 for receiving an RF modulation signal; an RF receiving stage 2 for differentially demodulating the RF modulation signal passed through antenna 1; a waveform shaping stage 3 for filtering and amplifying the demodulated signal from said RF receiving means 2, and, thereafter, shaping the waveform thereof into a secondary signal; an EEPROM 5 which stores the receiver's own specific data for discriminating the data corresponding to the pager receiver; a microcomputer 4 which controls the paging receiver, outputs the control signal BSS for battery-saving by predetermined periods as well as inputs the received data from waveform shaping stage 3, thereby to identify whether the received data is the conformed data or not by comparing it with the data stored in EEPROM 5, and controls the stored message display and the state of the receiver by a read key; an alert driver 6 for generating an alert signal under control of microcomputer 4; a loud speaker 7 for producing the alert tone by alert driver 6; a LCD 8 for displaying the message and the state data under the control of microcomputer 4; a key input stage 9 which is constituted by a read key and a silent key, so that it displays the stored message and produces the silent signal for preventing the system from generation of an alert sound; and a state driver 10 for displaying the state of the pager receiver under the control of microcomputer 4.

Figure 2:
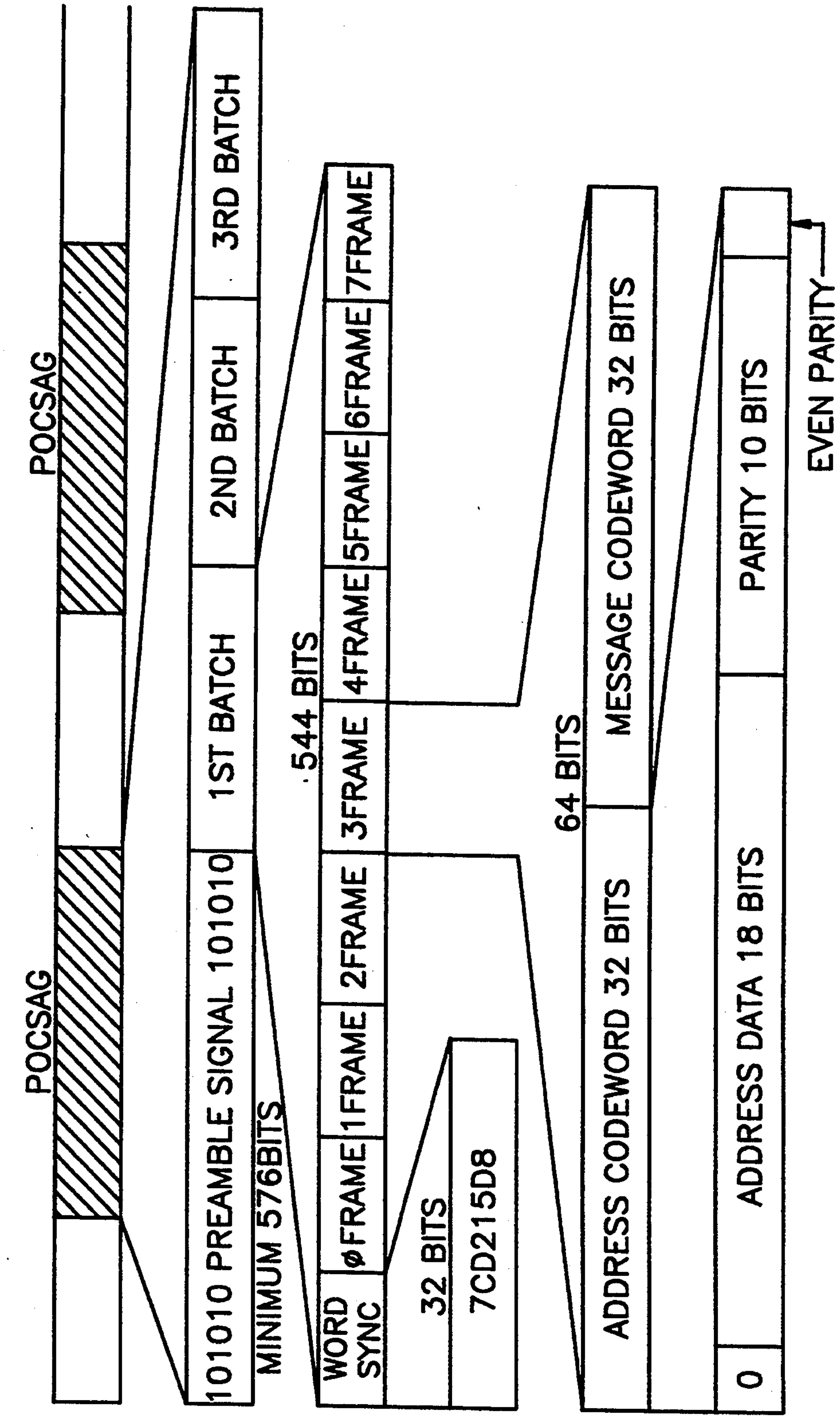
FIG. 2 is a format representing the POCSAG codes.

FIG. 2 represents a format of the POCSAG code units codes, wherein one POCSAG out of those POCSAG code units shown is constituted by a preamble signal and a plurality of batches, whose one batch is constituted by a word sync and eight frames, whose one frame is constituted by the address codeword of thirty-two bits and the message codeword of thirty-two bits, whose the address codeword is constituted by the address data of eighteen bits, the parity data of ten bits, 1 bit for identification of an address codeword, 2 bits of function bit and 1 bit of even parity, and its transmission speed is 512 bits per second.

Figure 3A:
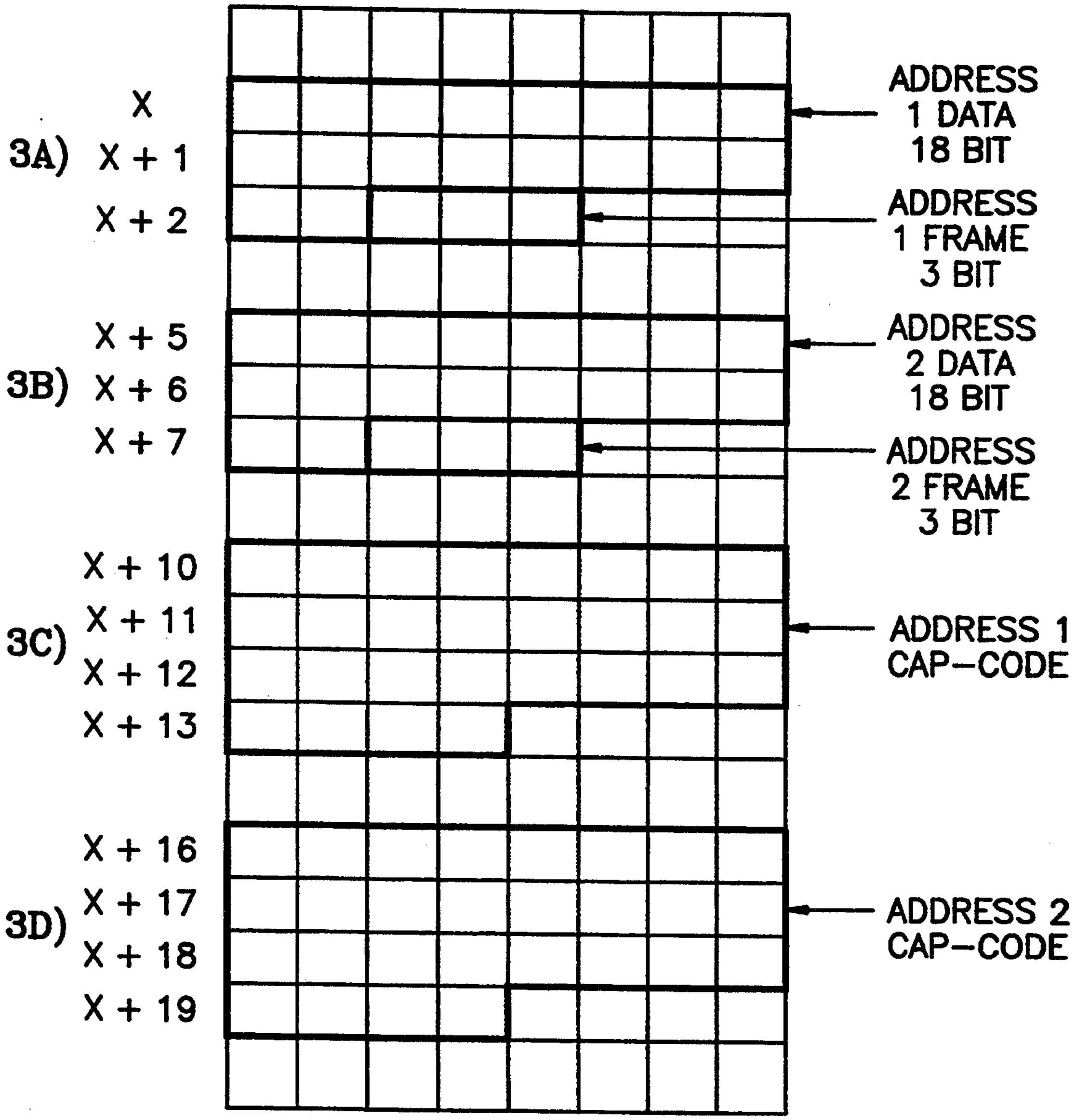
FIGS. 3(A) and 3(B) represent data maps of a ROM included in the system shown in FIG. 1.
Figure 3B:
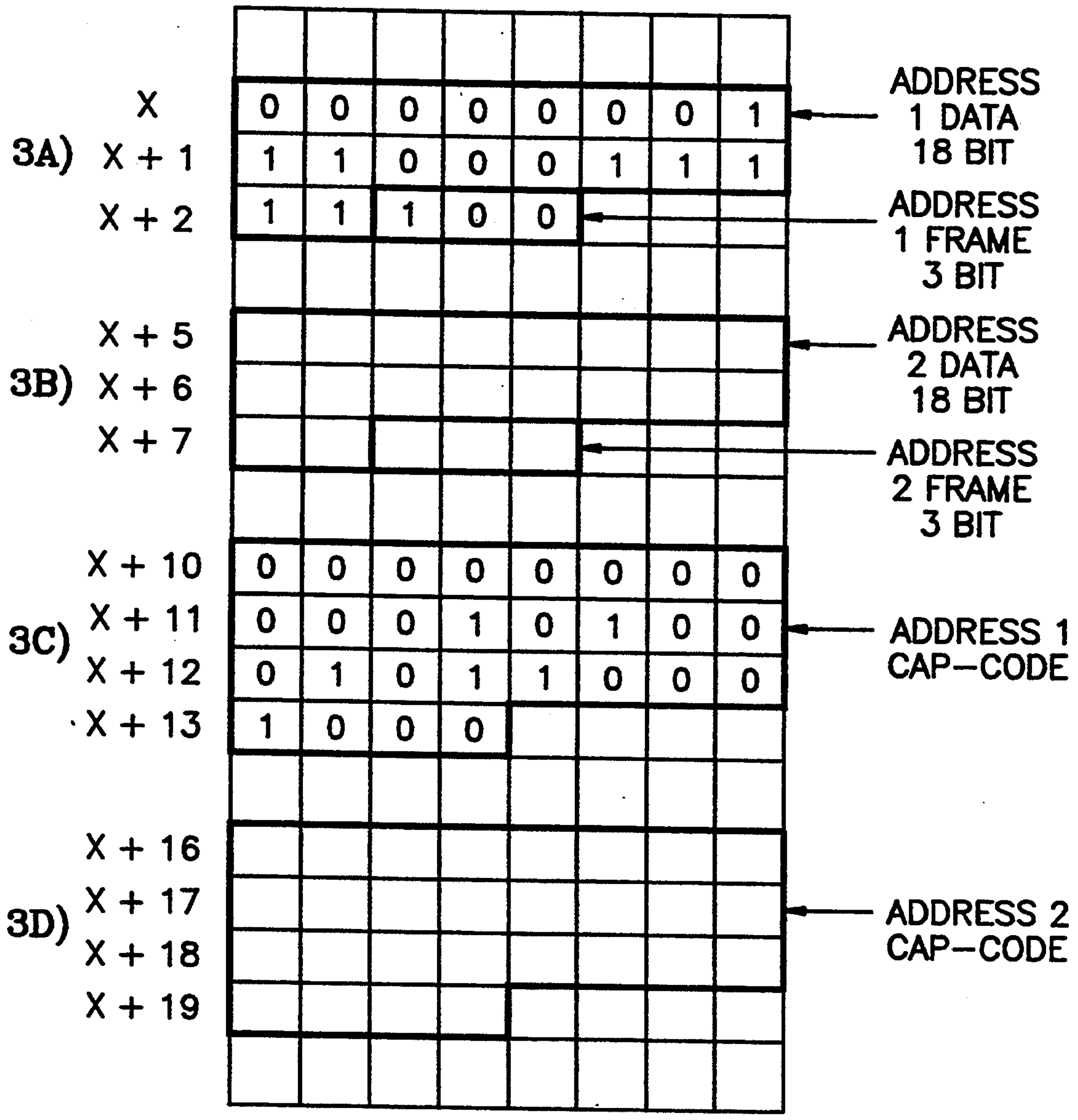

FIGS. 3(A) and 3(B) represent the data map in said EEPROM 5, wherein two 3 bit frame data and 18 bit address data can be stored and subsequently two decimal CAP codes can be stored.

Figure 4A:
FIG. 4 is a format representing the self address data displayed on a LCD.
Figure 4B:

FIG. 4 is a diagrammatic representation of the CAP code displayed on the LCD 8 in accordance with the data map in FIGS. 3(A) and 3(B), wherein FIGS. 4(A) and 4(B) diagrammatically shows an example of the CAP code display when a set of address data exists in the pager receiver capable of having two address data.

The present invention will be explained in detail according to the above-mentioned construction with respect to FIGS. 1 to 4. Before this however, the operation process of the pager receiver will be explained.

The RF receiving means 2, which receives the RF signal modulated in FSK through the antenna 1, amplifies and demodulates the modulated state of received data. At this time, it is assumed that the received message is in the form of a POCSAG code. The waveform shaping circuit 3, which receives the demodulated signal from RF receiving circuit 2, filters and amplifies the demodulated data and thereafter shapes it in logic level to apply the shaped signal to the microcomputer 4. At this time, in order to reduce the power consumption, the microcomputer 4 produces the battery saving signal BSS which is the signal for controlling the power supply to the receiving circuit 2 and the waveform shaping circuit 3 periodically or accordingly to the state of the received message to control power on or off.

Also, microcomputer 4, upon initial power "on", stores the address stored in EEPROM 5 in an internal memory RAM therein and also stores the corresponding address data bit of 18 bits of the POCSAG codes received through the waveform shaping circuit 3, and thereafter compares the two addresses to thereby identify whether the received data is the correct data or not. At this time, microcomputer 4 is a one chip processor using a LC5864 chip by SANYO Co., Ltd.

EEPROM 5 has a dual address constituted by an 18 bit address representing its own specific address of the corresponding pager receiver and 3 bit frame data as shown in FIG. 3(A), while the microcomputer 4 utilizes the frame data to select the 3-bit self frame data of the received eight frame data per batch, and compares the 18 bit address data of the received self frame data with the 18 bit address data of its own specific 18 bit address data stored in the EEPROM 5 to thereby identify whether the data is the correct data or not.

Thus, if the received data is identified as the correct data, the microcomputer 4 displays the message code word on LCD 8 and also drives the alert driver 6 to produce the alert signal, and the loud speaker generates the alert tone from the alert signal.

In the pager receiver as described above, first and second key data are produced through the key input stage, the first key data being produced through the read key 91 and the second key data being produced through the silent key 92. Silent key 92 produces, when receiving the message, the key instruction for preventing the system from driving the alert tone, and then the received message is stored in the internal memory of the microcomputer 4 and also is displayed on the LCD 8 for the time period of T2. And thereafter the calling information is to be displayed on the LCD 8.

Furthermore, the read key 91 is used with the intention of stopping an alert sound produced when the message is received or displayed on the LCD 8 the message being stored in the internal memory of the microcomputer 4 in the state that the message is not received.

Therefore, the state display driver 10 represents various states of the pager receiver under the control of the microcomputer 4, wherein a lamp 102 is driven during display of the message on the LCD 8 to thereby brighten the message display even in case where it is difficult to read the message as in the night, and maintains the "off" state for a period of the calling information. The LED 103 is driven when receiving the message to indicate visually the "alert" state, the LED being driven both in the normal mode and in the silent mode. Also, a motor 104 functions to vibrate the pager receiver, when receiving the message, in the silent mode to thereby make a user sense it.

In the usual pager receiver which uses the POCSAG code and operates as described above, the local specific CAP codes are given, which are the decimal numbers of 7 digits. Also, two million CAP codes can be entered therein. With a CAP code, the address code words on the POCSAG codes as in FIG. 2 are produced, the address codeword being 32 bits and being constituted by 1 bit for the identification of the address codeword, 18 bits for the address data, the 2 bits of function data, the parity data of 10 bits and the even parity of 1 bit. The address data bit (18 bits) is made by 7 digit CAP code. After the CAP codes are divided by 8 to obtain the quotient and the remainder, by binary-converting the quotient to 18 bits the address data bits are obtained and the remainder (i.e. the value between 0 and 7) constitutes the 3 bits of frame data to determine the frame number in the batch to be transmitted.

Thus, the address data of 18 bits and the frame data 3 bits are written in the EEPROM 5 of the pager receiver, and are used as the corresponding pager receiver address. In EEPROM 5, the ROM write is field-programmable and it is needed to verify the address. However, if the address data of 18 bits and the frame data of 3 bits are stored in the form of binary data as drawn in FIGS. 3(A) and 3(B), it is not easy to convert this data into the original CAP code which is 7 digits of decimal numbers in the microcomputer 4 of the pager receiver (in the microcomputer of the pager receiver, usually four-bit single chip microcomputer is used).

Therefore, when writting the data in the EEPROM 5 in order to convert into the original CAP code, the address data of 18 bits and the frame data of 3 bits into which the CAP code is converted are written therein as field 3A in FIG. 3(A), and thereafter the CAP code itself is written as a binary-coded decimal number as in field 3C of FIG. 3(A).

In the pager receiver, the address data 18 bits and the frame data 3 bits are used as the address necessary for calling as described above, and in case of displaying the address on the LCD 8 a binary-coded decimal representation of the 7 digit CAP codes in the EEPROM 5 are read and displayed. Also, in one pager receiver, a plurality of CAP codes can be stored. And in this case they can be extended as in fields 3B and 3D of FIG. 3(A).

In the method of reading the CAP code stored in the EEPROM 5 as described above, after the pager receiver is powered on, if the read key 91 is pushed down for a predetermined time in the state that there is no calling data, the CAP code [here, the CAP code of field 3C in FIG. 3(A)] in the first address is displayed on the LCD 8 as in FIG. 4(A), and if the read key 91 is kept in a depressed state the CAP code in the second address is displayed on the LCD 8. If the CAP code in the second address is not in use, it is displayed on the LCD 8 display as drawn in FIG. 4(B).

Here, it is assumed that the CAP code of any pager receiver is "0014588". The paging system uses the quotient of this CAP code after division by 8 for the address as the following formula [1] and uses the remainder thereof for the frame.

$$0014588 \div 8 = 1823 \ldots 4 \qquad [1]$$

wherein the quotient "1823" is used for the address, and the remainder "4" is used for the frame.

At this time, if the quotient and remainder of formula [1] are converted into the binary values in order to use the POCSAG code, the quotient ("1823") becomes "11100011111" which is used as the address bit, and the remainder ("4") becomes "100" which is used as the frame bit.

Accordingly, the address data 18 bit "000000011100011111" (here, because there are no data on the most significant bit side ("MSB"), "0"s are filled therein) and the frame data 3 bit "100" are written in the EEPROM 5 as in field 3A of FIG. 3(B), and the 7 digits of decimal CAP code are stored therein as at field 3C' of FIG. 3(*b*).

As described before, in the pager receiver using the EEPROM, the binary address, frame data and the decimal CAP code corresponding thereto are written in the EEPROM, and thereafter by only key operation the CAP code itself can be displayed on the LCD segments. Therefore, its own address can be displayed thereon. And also there is advantage which in that address verification of the pager receiver can be easily performed.

While the invention has been particularly shown and described with reference to a preferred embodiment, it will be understood by those skilled in the art that modifications in detail may be made without departing from the spirit and scope of the invention.

What is claimed is:

1. A method of displaying a self address decimal code in a pager receiver for receiving a calling signal, said pager receiver having a memory, a read key and a display, said method comprising the steps of:

storing a first plurality of bits representative of address data and a second plurality of bits representative of frame data, wherein said address data and said frame data are derived from said self address decimal code, in a first location of said memory for enabling said pager receiver to receive said calling signal;

storing binary-coded decimal representations of said self address decimal code in a second location of said memory; and reading out said binary-coded decimal representations in response to activation of said read key when no calling signal is being received by the pager receiver; and displaying on said display of said pager receiver the self address decimal code represented by said binary-coded decimal representations in response to said binary-coded decimal representations being read out.

2. The method as claimed in claim 1, wherein said step of reading out said binary-coded decimal representations further comprises the step of:

converting said binary-coded decimal representations to a decimal value wherein said decimal value is said self address decimal code and said self address decimal code is a cap code.

3. The method as claimed in claim 2 further comprising the steps of:

storing binary-coded decimal representations of a second self address decimal code in a third location of said memory;

reading out said binary-coded decimal representations of said second self address decimal code in response to said read key being continuously activated for a predetermined time; and displaying said second self address decimal code in response to said binary-coded decimal representations of said second self address decimal code being read out.

4. The method as claimed in claim 1 further comprising the steps of:

storing binary-coded decimal representations of a second self address decimal code in a third location of said memory;

reading out said binary-coded decimal representations of said second self address decimal code in response to said read key being continuously activated for a predetermined time; and displaying said second self address decimal code in response to said binary-coded decimal representations of said second self address decimal code being read out.

5. A method of displaying a self cap code of a pager receiver responsive to a "POCSAG code" for receiving a calling signal, said paging receiver having a memory, a read key and a display, said method comprising the steps of:

storing address data and frame data in a first location of said memory for enabling said pager receiver to receive said calling signal, said frame data representing a frame of said "POCSAG code" in which said address data is transmitted to said pager receiver, said address data and said frame data being derived from said self cap code;

storing binary-coded decimal numerals representative of said self cap code in a second location of said memory; and displaying the self cap code represented by the binary-coded decimal numerals stored in said second location of said memory on the display of said pager receiver in response to activation of said read key when no calling signal is being received by the pager receiver.

6. The method as claimed in claim 5 further comprising the steps of:

storing binary-coded decimal numerals of a second self cap code in a third location of said memory;

reading out said binary-coded decimal numerals stored in said third location of said memory in response to said read key being continuously activated for a predetermined time; and displaying said second cap code represented by the binary-coded decimal numerals stored in said third location of said memory on the display of said pager receiver in response to said binary-coded decimal numerals being read out from said third location of said memory.

7. The method as claimed in claim 5, wherein said displaying step further comprises the steps of:

reading out said binary-coded decimal numerals stored in said second location of said memory in response to activation of said read key; and converting said binary-coded decimal numerals to a decimal value wherein said decimal value is said self cap code.

* * * * *

UNITED STATES PATENT AND TRADEMARK OFFICE

CERTIFICATE OF CORRECTION

PATENT NO. : 5,381,132
DATED : 10, January 1995
INVENTOR(S) : Young-Han Yun

It is certified that error appears in the above-indentified patent and that said Letters Patent is hereby corrected as shown below:

| | | |
|---|---|---|
| Column 1 | Line 22, | preceding "pager", insert -- the --; |
| | Line 46, | preceding "EEPROM", change "a" to -- an --; |
| Column 2 | Line 68, | preceding "receiving", insert -- RF --; |
| Column 4 | Line 17, | after "chip", change "microcomputer" to -- microprocessor --, |
| | Line 25, | after "data", insert -- of --, |
| | Line 26, | after "data", insert -- of --; |

Signed and Sealed this

Third Day of October, 1995

*Attest:*

Bruce Lehman

BRUCE LEHMAN

*Attesting Officer* *Commissioner of Patents and Trademarks*